United States Patent [19]

Pelt

[11] Patent Number: 5,004,269
[45] Date of Patent: Apr. 2, 1991

[54] STEPPED TOP FLUID STORAGE TANK

[75] Inventor: J. Eugene Pelt, Ardmore, Okla.

[73] Assignee: Spade leasing, Inc., Springer, Okla.

[21] Appl. No.: 444,393

[22] Filed: Dec. 1, 1989

[51] Int. Cl.$^5$ .............................................. B60P 3/22
[52] U.S. Cl. .................................. 280/837; 280/839; 296/210
[58] Field of Search ................ 296/181, 210; 280/163, 280/831, 832, 837, 838, 839; D12/95; 220/1 B, 1 V, 1.5, 5 A, DIG. 24; 52/18, 45, 56, 57; 105/377, 379, 430

[56] References Cited

U.S. PATENT DOCUMENTS

| D. 138,245 | 3/1944 | Bradley | D12/95 |
| Des. 253,051 | 10/1979 | Pletcher | D12/95 |
| 1,268,588 | 6/1918 | Lichenstein | 105/377 X |
| 3,001,331 | 9/1961 | Brunton | 52/18 X |
| 3,342,523 | 9/1967 | Lutgen | 220/1.5 X |
| 3,678,867 | 7/1972 | Brinks et al. | 105/377 |
| 4,114,716 | 9/1978 | Sanders | 280/163 X |
| 4,318,549 | 3/1982 | Pletcher | D12/97 |

FOREIGN PATENT DOCUMENTS 1434865 2/1969 Fed. Rep. of Germany ..... 220/5 A

Primary Examiner—David M. Mitchell
Assistant Examiner—Martin W. Gerich
Attorney, Agent, or Firm—Laney, Dougherty, Hessin & Beavers

[57] ABSTRACT

A mobile fluid storage tank having a pair of generally trapezoidally-shaped, substantially parallel side walls, a bottom wall, a back wall and a forward wall extending substantially parallel to the back wall. A stepped top wall slopes downwardly from a location spaced forwardly from near the back wall toward the forward wall, and defines a plurality of transversely extending steps which individually include a substantially horizontally extending step surface which extends substantially parallel to the bottom wall. A plurality of longitudinally extending rub bars or diverter rods extend from a position near the forward wall rearwardly across the edges of the steps to divert and deflect limbs and the like away from the steps.

5 Claims, 2 Drawing Sheets

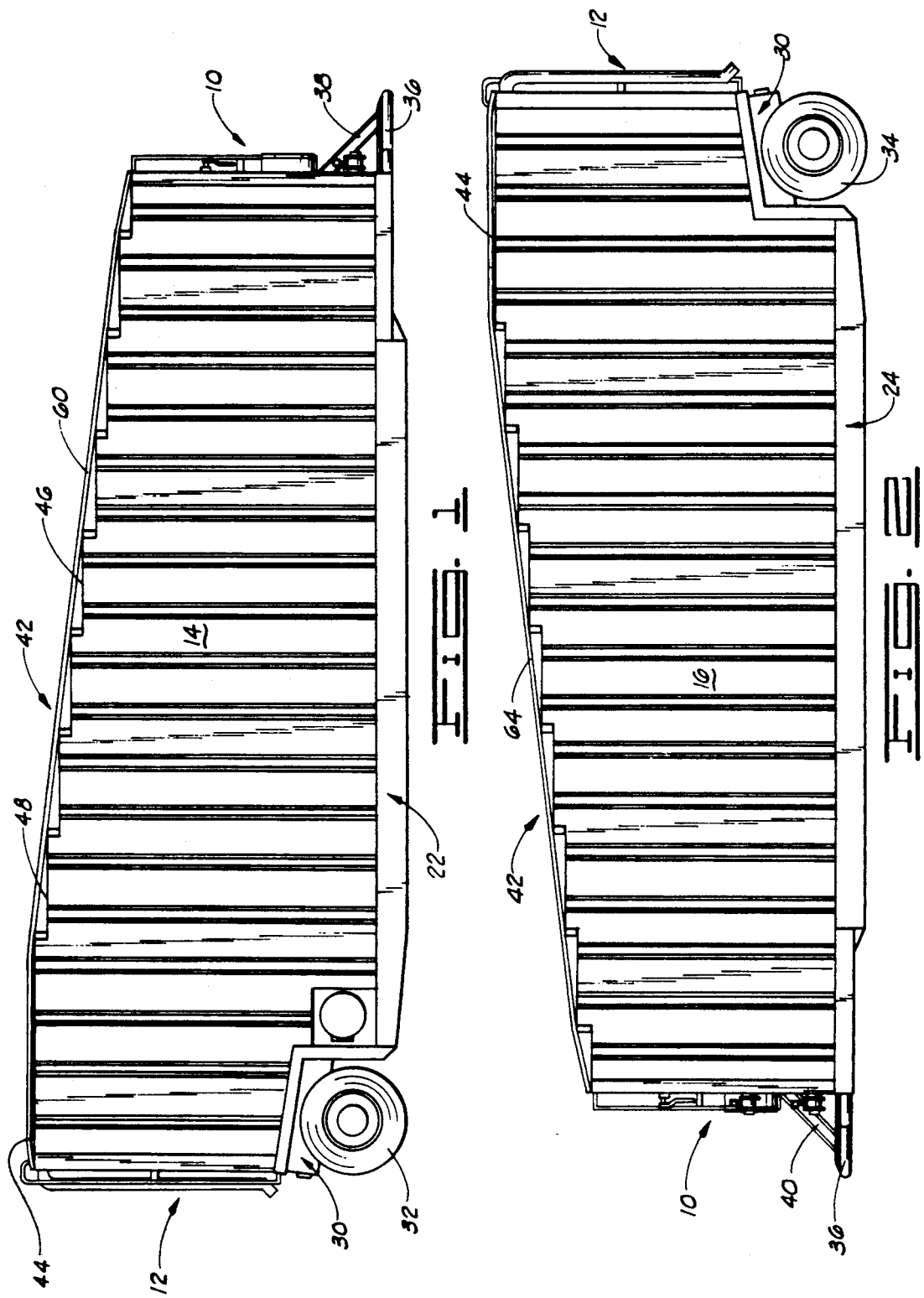

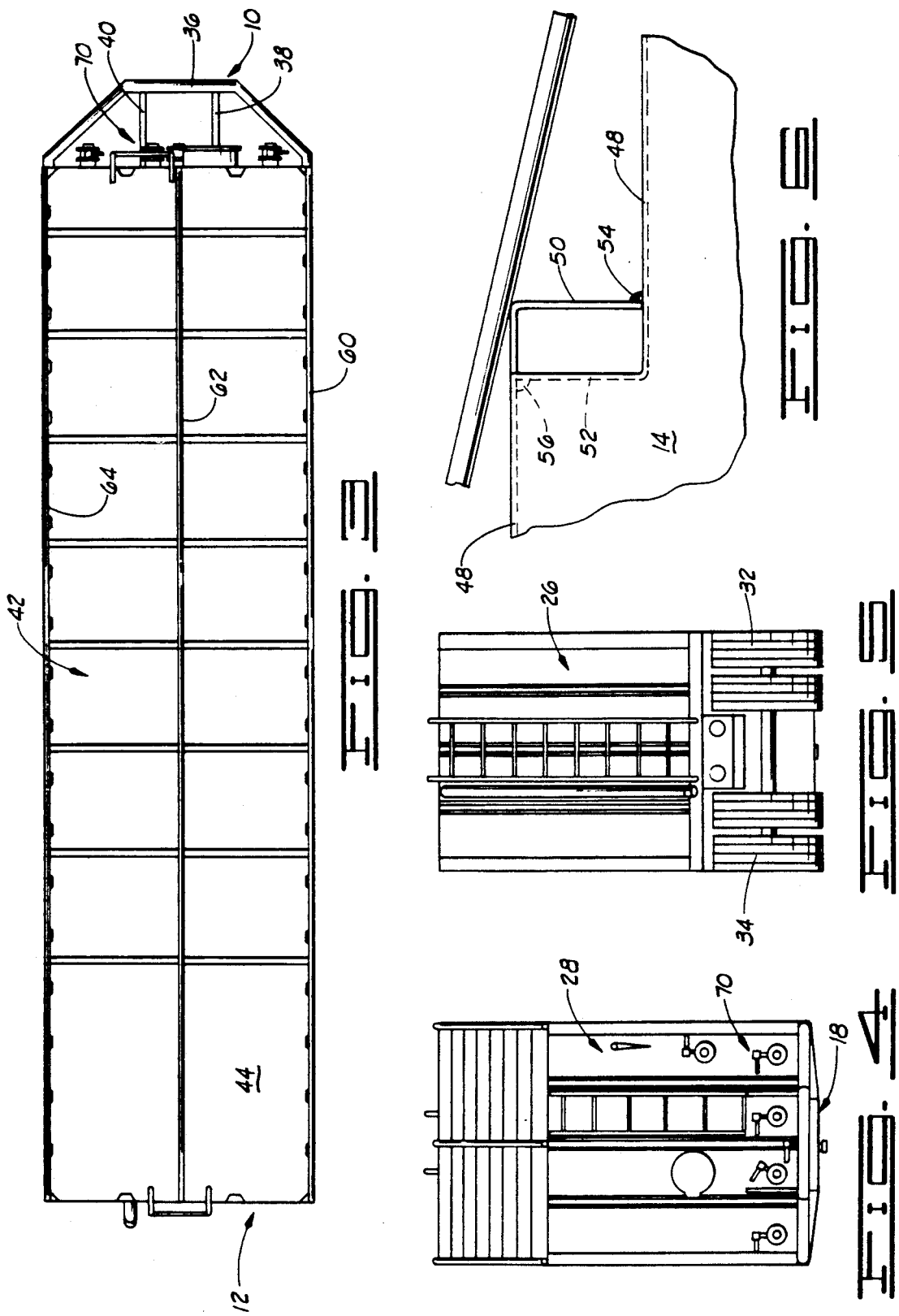

STEPPED TOP FLUID STORAGE TANK

Field of the Invention

This invention relates to a fluid storage tank of the type which can be rested on the ground during the storage therein of a fluid, such as a fracturing fluid or the like, and can be used as a source of dispensation of the fluid at a well site or other point of usage of the fluid, but which can be skidded along the ground from one location to another over a relatively short distance, or which can be hooked up to a suitable towing vehicle for towing over-the-road over relatively long distances when the fluid storage tank is empty.

BACKGROUND OF THE INVENTION Brief Description of the Prior Art

A number of types of fluid storage tanks have heretofore been provided, and some of these are intended to be easily transported from one location to another by towing behind a towing vehicle at a time when the tank is empty and between usages thereof. Two such tanks are those which are illustrated and described in U.S. Pat. No. DES.-253,051 and in U.S. Pat. No. 4,318,549. These fluid storage tanks are generally trapezoidally-shaped from the forward end to the rear end, and this enables them to be supported at the rear end upon a pair of ground engaging wheels at a time when the fluid storage tank is to have its front end lifted upwardly, and secured behind a towing vehicle so that the top of the tank becomes substantially horizontal. The tank is intended to be towed while it is empty, and is intended to be rested flatly upon the ground when it is in use for storing the fluid to be dispensed therefrom at a well site or the like.

It has been customary and conventional, and such construction is without exception so far as Applicant is aware, to construct the top of fluid storage tanks of the type described of a flat expanse of metal which constitutes a substantially unitary unbroken expanse from a point relatively near to the rear of the tank to the front of the tank. Thus, the tank top slopes downwardly gradually at a time when the tank is rested upon the ground and fluid is stored therein.

A problem which is confronted not infrequently in the use of trapezoidally-shaped fluid storage tanks of the type described is that of slipping or falling on top of the tank at a time when a person must be at that location for the purpose of gauging the fluid left in the tank, entering the tank for purposes of inspecting certain parts of it, or effecting maintenance to one or more structures located at, or near, the top of the tank. If the tank has been used to store a fluid in inclement weather conditions, under which conditions the top of the tank has become iced or extremely slick, then the danger of the person becoming injured by slipping and falling upon the top of the tank, or even falling or sliding over the side of the tank, are very much increased.

BRIEF DESCRIPTION OF THE PRESENT INVENTION

The present invention provides a fluid storage tank having a stepped top which enables anyone who must be on top of the tank for repairing the tank, or gauging the fluid therein, to maintain a much surer footing than in storage tanks as previously constructed. The footing of the person who may be traversing the top of the tank is almost always upon a flat, horizontally extending surface at a time when the person is at that location, and thus the chances of falling are substantially reduced.

The tank further includes elongated rub bars which are extended across the forward edges of the steps provided at the top of the tank and function to prevent limbs and other overhanging structures from becoming undesirably hung or fouled on the top of the storage tank at a time when the storage tank is being moved slowly along the ground from one location to another.

An important object of the invention is to provide a storage tank which can be transported while supported upon a single set of wheels located near the rear of the tank by lifting the forward end of the tank upwardly for attachment to a tractor or other suitable towing vehicle.

An important object of the invention is to provide a stepped top construction in a fluid storage tank of the type which normally is rested flatly upon the ground and is of a trapezoidal general configuration as viewed in side elevation. By reason of the provision of the stepped top, the footing of a person required to work on top of the tank is surer, and there is substantially less danger of serious accidents happening or occurring as a result of the person slipping and falling as he moves about on the top of the tank.

A further object of the invention is to provide a ceiling or top construction for fluid storage tanks which is very much stronger mechanically than the types of tops previously provided on large fluid storage tanks suitable for over-the-road transport at a time when the tanks are empty.

Another object of the invention is to provide dual functioning bar structures on the upper side of the fluid storage tank having an inclined top wall when the tank is in use, so that these bars can be used both to prevent any sort of limbs or overhanging structures from hanging on the top of the tank, and also to provide hand holds and safety structures for a person who may be traversing the top of the tank for an reason.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of one side of the fluid storage tank of the invention as it appears when it rests on the ground for purposes of dispensation of a fluid, such as a fracturing fluid or the like, therefrom.

FIG. 2 is a side elevation view of the fluid storage tank depicted in FIG. 1, and showing the opposite side of the tank from that which is shown in FIG. 1.

FIG. 3 is a plan view of the fluid storage tank shown in FIGS. 1 and 2.

FIG. 4 is a front or forward elevation view of the fluid storage tank.

FIG. 5 is a rear elevation view of the fluid storage tank.

FIG. 6 is a constructional detail illustrating the manner in which one of a plurality of diverting rods is secured across the edge of a step formed in the top of the fluid storage tank.

DETAILED DESCRIPTION OF A PREFERRED EMBODIMENT OF THE INVENTION

The mobile fluid storage tank of the invention is an elongated tank-type enclosure which has a front or forward end, designated generally by reference numeral 10, a rear end, designated generally by reference numeral 12, and a pair of opposed, substantially vertically extending side walls shown in FIGS. 1 and 2, and there designated generally by reference numerals 14 and 16. The two substantially parallel, vertically extending side walls 14 and 16 are generally trapezoidally configured in side elevation. The tank further includes a bottom wall 18 which is preferably constructed in a generally V-shaped configuration in the manner disclosed in U.S. Design patent application Ser. No. D-387,108.

Suitable skid support beams 22 and 24 are secured to the underside of the bottom wall, and function to support the tank when it is in a stationary (non-transport) status, and is supported by the ground during fluid dispensation therefrom. The tank is further provided with a rear wall 26 and a forward wall 28. At the rear of the tank, an inset wheel well recess 30 is provided in the lower, rear side of the tank to accommodate pairs of ground-engaging wheels 32 and 34. At the front or forward side of the tank, a large, horizontally extending towing bar 36 projects forwardly from the front wall of the tank, and is braced and reinforced by a pair of diagonal braces 38 and 40.

In addition to the side walls 14 and 16, the back or rear wall 26, the forward wall 28 and the floor or bottom 18, the storage tank includes a top or ceiling designated generally by reference numeral 42. The top 42 includes a substantially horizontally extending rear top panel 44 which projects from the rear wall 26 forwardly for a distance which is approximately one-fourth of the total distance from the rear wall to the forward wall 28 of the storage tank. Extending forwardly from the rear top panel 44 to the forward wall 28 of the storage tank is a stepped top closure subassembly 46. The stepped top closure subassembly 46 includes a plurality of steps which are each formed by a generally horizontally extending step plate which extends transversely substantially entirely across the top of the tank.

FIG. 6 of the drawings illustrates in magnified detail, a constructional aspect of the stepped top closure subassembly 46 of the invention. Here, the transversely extending step plate 48 of one of the steps is illustrated, and the transversely extending step plate 48 of the next lower step is also illustrated. The panels which make up one of the side walls 14 of the tank are shown in FIG. 6.

It will be noted that at its forward edge the step plate 48 is bent through an angle of 90° so that the forward portion of the step plate forms a facing plate or riser 50. Thus, although the riser plate 50 is actually a part of, and an extension of, the step plate 48, it extends downwardly perpendicular to the principle part of the step plate 48. The step plate 48 below the higher of the two step plates illustrated in FIG. 6 has its rear end portion turned up so that this turned up portion extends normal to the horizontally extending part of the upper step plate. This upwardly extending rear portion of the lower step plate 48 may be termed an internal riser, and is shown in dashed lines and is designated by reference numeral 52.

A pair of elongated weld beads constituting fillet welds are used for joining the lower step plate 48 to the upper step plate 48 at the places shown. The fillet weld beads are here denominated by reference numerals 54 and 56. After the end portions of the two step plates 48 have been bent in the manner shown, and joined by welding as shown, box caps are placed over the opposite ends of the tubular box thus formed to close the box-shaped structure at the riser portions of each of the steps in the step top closure subassembly 46. By this construction, water, dust or other deleterious materials are prevented from entering this space, and the integrity of the steps is maintained. Moreover, the roof as thus constructed is characterized in having great structural strength due to this effective reinforcement at each corner of the steps which go into the makeup of the stepped top closure subassembly.

In order to prevent limbs or overhanging structures from becoming hung up with the steps formed in the stepped top closure subassembly, three rub bars or deflection bars 60, 62 and 64 are extended from the forward end of the storage tank to the flat, horizontally extending rear top panel 44 forming the top at the rear end portion 12 of the tank. Actually, each of the rub bars 60, 62 and 64 is extended completely to the rear wall 26 along the upper side of the storage tank, and has an end which is there welded to the horizontally extending rear top panel 44. The rub bars as thus provided extend parallel to each other, and run essentially all of the way from the front 10 of the tank to the rear 12 thereof. By bridging across, and being secured to, the edge of each of the steps formed by the step plates 48 to cumulatively form the stepped top closure subassembly, these rub bars effectively deflect any limbs or interfering structures which otherwise might tend to hang up against the forward facing side or riser of each of the steps formed in the top.

USE AND OPERATION OF THE FLUID STORAGE TANK OF THE INVENTION

In utilizing the fluid storage tank depicted in the drawings and hereinbefore described, the normal utilization of the fluid storage tank is in an "at rest" position at a situs where the fluid contents of the tank are to be dispersed, usually over an extended period of time. One use of this type of tank which occurs relatively frequently is its use as a storage tank for fracturing fluid used in the fracturing of an oil or gas well. From other types of tanks, the fracturing fluid is pumped into the storage tank at the location where it is to be used, and then is removed from the tank as needed at the well sight for pumping to a subterranean location where production stimulation by fracturing is to be accomplished. For this purpose, various valves are provided at the front side of the storage tank, and these are illustrated in FIG. 4 of the drawings and there denominated generally by reference numeral 70. Other valves and access ways into the tank are provided for filling the tank, for flushing the tank after use and the like.

Since the need for a fluid storage tank at a specific location where fluids of the type stored therein are needed will seldom be permanent, it is desirable that the tank, after it has been emptied, can be moved or transported to another location for re-use at that location. In such instances, the empty tank is towed behind a suitable truck or tractor vehicle which is connected to the front side 10 of the fluid storage tank by the use of the hitch bar 36. When the tank is lifted up at the front end so as to facilitate attachment to the towing vehicle, the stepped top of the fluid storage tank will normally extend substantially horizontally, and the horizontally extending rear panel 44 will at that time slope slightly to the rear. Most of the weight of the empty tank will be carried upon the wheels 32 and 34 at the rear of the tank, with the balance being shifted to, and supported by, the towing vehicle. The trapezoidal shape of the tank, and its relatively short front wall 28 assure that when it is lifted up in the manner described, it will not present an excessive height for over-the-road highway travel.

When the tank is in its "at rest" and "in use" position as illustrated in FIG. 1, the skid bars or beams 22 and 24 rest on the ground, and the tank can actually be skidded slowly from one location to another if this is required to finally adjust the position which it will occupy during the time that it is in use for storing and dispensing a fluid. When the tank is resting upon the ground as shown in FIGS. 1 and 2, it will be noted that the trapezoidal configuration of the tank which enables it to be towed more easily without violating certain height limitations for over-the-road highway travel causes the top of the tank to slope downwardly from the highest point near the rear of the tank (actually, immediately adjacent the forward edge of the horizontally extending rear top panel 44) to the forward end of the tank. Since it is often necessary for personnel to go to the top of the tank to take soundings to determine the depth of the fluid therein, and to effect maintenance, and for other reasons, the sloping top of the tank would be dangerous in wet, or particularly, in snowy or icy weather since the sloping top would tend to be difficult to walk on without slipping or falling. Serious injuries have occurred as a result of accidents occurring in this way.

By the construction which is introduced by the present invention, the danger of an accident occurring as one traverses the top of the tank, or even stands thereon, are greatly reduced. This is because the horizontal steps making up the stepped top closure subassembly which forms the upper side of the tank each afford a stable footing on a horizontal surface. There is thus no propensity, by reason of slope in any direction, for a person standing on top of the tank to slip and fall.

Moreover, in especially bad weather conditions, the rub bars 60, 62 and 64 afford the dual function of providing barriers or restraints which might prevent a fall to one side or the other of the tank if the person should loose their footing, which, of course, one can do just as one can fall when on a seemingly level surface during an especially bad ice storm. Further, if the person on top of the tank has a need to move toward one end or the other of the tank at a time when the exterior of the tank is particularly slick and treacherous due to icing, the rub bars 60, 62 and 64 can be used as hand holds to allow someone kneeling or sitting on top of the tank to move more easily and safely from one location to another. Finally, by use of the rub bars welded or otherwise suitably secured to the forwardly facing edge of each of the steps, and the concurrent use of the over turned, interlocking step faces to form a double riser step of the sort described, a very mechanically strong and sturdy structure is provided at the upper side of the tank which assures that early structural fatigue and failure of the tank will not occur, and that the effective operating life of the tank will be significantly extended.

Although a presently preferred embodiment of the invention has been herein described in order to illustrate the principles of the invention, and the way they are utilized in this one embodiment of the invention, these same principles can be used in other structures to form fluid storage tanks which may become preferred embodiments at some time in the future. Such structurally different embodiments which still rely on the basic structures required to deliver the advantages described, and to place into tangible form the principles here relied upon, are deemed to be within the spirit and scope of the invention. In this regard, the claims should be given a reasonably broad interpretation in order to protect the inventor's concepts from being lost through copying principles and substance, though altering the form of the structure in which they are embodied.

What is claimed is:

1. A fluid storage tank having a top, an underside, a front end and a rear end, and further including:
   a pair of substantially parallel side walls;
   a rear wall;
   a forward wall;
   a floor; and
   a ceiling which includes:
      a flat substantially monoplanar rear panel adjacent said rear wall and extending forwardly toward said forward wall and extending substantially normal to said rear wall;
      a stepped topped closure subassembly extending from said rear panel to said forward wall and inclined downwardly toward said floor and including:
         a plurality of substantially contiguous steps each including a step plate and a riser plate extending normal to said step plate, said riser plate being joined at an edge thereof to the step plate of the contiguous step; and
         a plurality of parallel rub bars extending fore-and-aft above said ceiling and joined to said steps at the exposed edges thereof where the step plate and riser plate are joined to each other.

2. A fluid storage tank as defined in claim 1 and further characterized as including:
   a plurality of ground engaging wheels mounted on the underside of said tank adjacent the rear wall thereof; and
   towing means secured to the front end of said tank for allowing the tank to be transported by towing when said tank is supported on said ground-engaging wheels.

3. A fluid storage tank having a top, an underside, a rear end, and further including:
   a pair of substantially parallel side walls;
   a rear wall;
   a top wall;
   a bottom wall; and
   a ceiling which includes:
      a flat, substantially monoplanar rear panel adjacent said rear wall and extending forwardly toward said forward wall; and
      a stepped top closure subassembly extending from said rear panel to said forward wall and including:
         a plurality of substantially contiguous steps each comprising:
            a horizontally extending step plate extending transversely across the top of the tank and having a forward edge toward the front of the tank, and a rearward edge toward the rear of the tank;
            a first riser extending transversely across the top of the tank and joined to the forward edge of the step plate, and extending normal to, and formed integrally with said step plate, said first riser further including a lower edge contacting and joined to the upper surface of the step plate of an adjacent and lower step; and a second riser extending substantially parallel to said first riser and transversely across the top of the tank, said second riser being formed integrally with said step plate of said adjacent and lower step plate, and having an upper edge joined to the lower surface of said first mentioned step plate which carries, and is formed integrally with, said first riser; and a plurality of parallel rub bars extending fore-and-aft along said ceiling and joined to said steps at the exposed edges thereof, each of said bars being secured along its length to the step plate and the first riser of each of the steps at the step edge formed at the intersection of the step plate and the first riser of each of said steps.

4. A fluid storage tank as defined in claim 3 wherein said first and second risers and steps form tubular enclosures of rectangular cross-section, and wherein said stepped top closure subassembly further includes end caps secured to, and closing the opposite open ends of said tubular enclosures.

5. A fluid storage tank having a top, an underside, a front end and a rear end, and further including:
   a pair of substantially parallel side walls;
   a rear wall;
   a forward wall;
   a bottom wall; and
   a ceiling which includes:
      a flat substantially monoplanar rear panel adjacent said rear wall and extending forwardly toward said forward wall and extending substantially normal to said rear wall;
   a stepped top closure subassembly extending from said rear panel to said forward wall and converging toward said bottom wall and including:
      a plurality of substantially contiguous steps each having a forward portion in the form of a tubular enclosure located at a different vertical level from each of the adjacent steps, and each of said steps including:
         a step plate; and
         a riser plate extending substantially normal, downwardly to the step plate, said riser plate forming with a part of the step plate, two sides of a generally rectangular tube constituted by said tubular enclosure;
   a plurality of transversely spaced rub bars extending fore-and-aft over said ceiling and joined at longitudinally-spaced points to said steps at the edge of each step formed by the intersection of the step plate thereof with the riser plate thereof, whereby said rub bars are joined to the steps at a plurality of locations spaced along the length of each rub bar;
   a plurality of ground-engaging wheels mounted on the underside of said tank adjacent said rear wall thereof; and
towing means secured to said tank adjacent said forward wall allowing the tank to be transported by towing when said tank is supported on said ground-engaging wheels.

* * * * *